United States Patent [19]

Nakamura et al.

[11] Patent Number: 4,573,153
[45] Date of Patent: Feb. 25, 1986

[54] DATA TRANSMITTING-RECEIVING SYSTEM FOR SUPPRESSING DATA ERROR

[75] Inventors: Hiroshi Nakamura, Sagamihara; Eisuke Fukuda, Yokohama; Susumu Sasaki, Fujisawa, all of Japan

[73] Assignee: Fujitsu Limited, Kawasaki, Japan

[21] Appl. No.: 556,552

[22] Filed: Nov. 30, 1983

[30] Foreign Application Priority Data

Dec. 6, 1982 [JP] Japan .................... 57-212759

[51] Int. Cl.⁴ ............................................. G06F 11/00
[52] U.S. Cl. .............................. 371/22; 371/30; 371/68
[58] Field of Search ............... 371/15, 22, 30, 34–35, 371/67–68; 375/10, 25–26, 38; 340/347 DD, 350; 455/102–103; 324/73 R, 73 AT

[56] References Cited

U.S. PATENT DOCUMENTS

| | | | |
|---|---|---|---|
| 3,781,795 | 12/1973 | Zegers | 340/146.1 BE |
| 4,001,692 | 1/1977 | Fenwick et al. | 371/68 X |
| 4,070,648 | 1/1978 | Mergenthaler et al. | 371/34 X |
| 4,076,961 | 2/1978 | Holsinger et al. | 371/22 X |
| 4,291,408 | 9/1981 | Ogawa et al. | 371/22 X |
| 4,317,207 | 2/1982 | Fujimura et al. | 340/347 DD |
| 4,439,863 | 3/1984 | Bellamy | 340/347 DD |
| 4,447,903 | 5/1984 | Sewerinson | 371/68 |
| 4,475,214 | 10/1984 | Gutlebar | 370/18 X |

Primary Examiner—Gary V. Harkcom
Attorney, Agent, or Firm—Staas & Halsey

[57] ABSTRACT

A data transmitting-receiving system includes a transmitter unit, a transmission line, and a receiver unit. The transmitter unit includes a first memory circuit receiving first digital input data to be transmitted, a first digital/analog (D/A) converter, a second memory circuit receiving second digital input data to be transmitted, and a second D/A converter. The first and second memory circuits can provide a first digital correction output and a second digital correction output, respectively. The first and second digital correction outputs are composed of both an own-side correction output connected to an own-side channel route and an other-side correction output connected to an other-side channel route.

10 Claims, 6 Drawing Figures

DATA TRANSMITTING-RECEIVING SYSTEM FOR SUPPRESSING DATA ERROR

BACKGROUND OF THE INVENTION

1. Field of the Invention

The present invention relates to a data transmitting-receiving system.

2. Description of the Prior Art

Various systems are used for transmitting and receiving data. Whichever system is employed, attention must be paid to the reliability of the data.

A known data transmitting-receiving system includes a transmitter unit and a receiver unit connected together via a transmission line.

The transmitter unit includes a first level converter which produces an analog level signal according to a combination of the first digital input data of a plurality of channels allotted to a first channel route, and a first mixer receiving, at its first input, a first analog output from the first level converter and, at its second input, a first carrier signal. The transmitter unit also includes a second level converter producing analog level signal according to a combination of the second digital input data of a plurality of channels allotted to a second channel route, a second mixer receiving, at its first input, a second analog output from the second level converter and, at its second input, a second carrier signal and a hybrid circuit for adding the analog outputs of the first and second mixers with each other. An amplifier for amplifying the output from the hybrid circuit to a transmission power level is also provided.

The receiver unit includes a first demodulator and a second demodulator, which reproduce transmission signals corresponding to the first and second channel routes, respectively. The first and second demodulators then demodulate the thus reproduced analog level signals into first digital output data and second digital output data, respectively.

In the above prior art system, various factors cause data error. The factors are, for example, non-linearity of the amplifier in the transmitter unit, modulation distortion of the mixer in the transmitter unit, temperature variation, and aging of the system itself. Many proposals have been made for coping with these problems individually to improve data reliability, but few proposals have been made for coping with all of these problems at once.

SUMMARY OF THE INVENTION

It is an object of the present invention to provide a data transmitting-receiving system which can easily cope with the various factors causing a data error.

The above object is attained by the following. In the transmitter unit, the first and second level converters are constructed by a memory circuit and a digital-/analog (D/A) converter. The memory circuit provides a predetermined data output corresponding to the digital input data and, at the same time, a correction digital data output for compensating data error.

BRIEF DESCRIPTION OF THE DRAWINGS

The present invention will be more apparent from the ensuing description with reference to the accompanying drawings, wherein.

DESCRIPTION OF THE PREFERRED EMBODIMENTS

Figure 1:
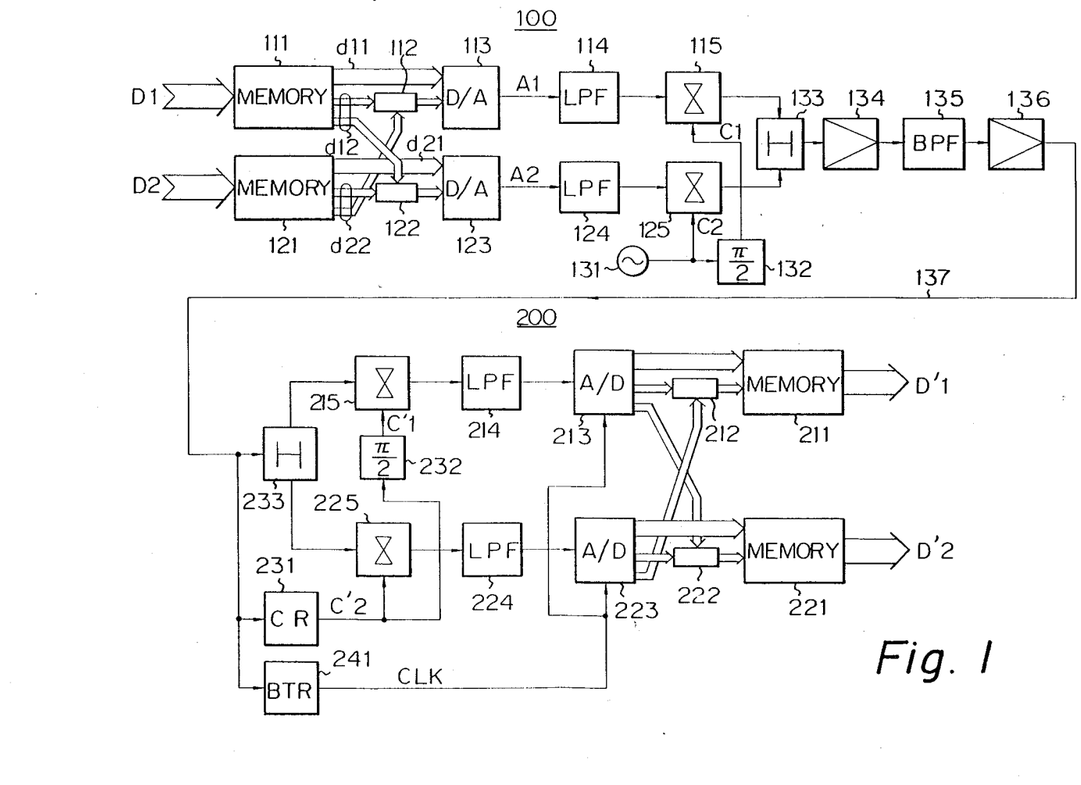
FIG. 1 is a block diagram of a data transmitting-receiving system according to an embodiment of the present invention.

FIG. 1 is a block diagram of a data transmitting-receiving system according to an embodiment of the present invention. In FIG. 1, reference numeral 100 represents a transmitter unit, 200 a receiver unit, and 137 a transmission line connecting the two. The transmission line 137 may be a microwave line, a millimeter wave line, or a cable line. Reference character D1 denotes digital input data of a first channel route, which is usually composed of multiplexed data of a plurality of channels. The blocks referenced by numerals 111, 112, and 113 together form a first level converter from which an analog level signal is produced in accordance with various combinations of the plurality of first channel digital input data, such as "1", "0", "1" and "0", "1", "1" in the case of three channels. A first analog output A1 from the first level converter (111, 112, 113) is applied via a low-pass filter (LPF) 114 to a first mixer 115 at its first input. The low-pass filter 114 is used for spectrum shaping the output signals.

Reference numeral 131 represents a carrier generator which produces a first carrier signal C1, by way of a phase shifter ($\pi/2$) 132, to be applied to the first mixer 115 at its second input. Thus, a modulation operation is performed by the first mixer 115 having the first analog output signal A1 at its first input.

On the other hand, reference character D2 denotes digital input data of a second channel route, which is usually composed of multiplexed data of a plurality of channels, as is the data D1. The description of the operations for the data D1 also apply to the data D2. Reference numerals relating to the data D2 bear a second digit of "2" instead of "1". Further, a second carrier signal C2 is $\pi/2$ out of phase with the first carrier C1 signal.

The analog outputs from the first mixer 115 and the second mixer 125 are added to each other at a hybrid circuit (H) 133. The added output is then transferred, via an intermediate frequency (IF) amplifier 134 and a band-pass filter (BPF) 135, to a high-power amplifier 136 and amplified therein to a transmission power level. The thus amplified transmission signal reaches, via the transmission line 137, the receiver unit 200. The transmission signal is branched at a hybrid circuit (H) 233. The branched signals are reproduced by a first receiver side mixer 215 and a second receiver side mixer 225, into a first channel route signal and a second channel route signal, respectively. In this reproducing operation, a first recovery carrier signal C'1 and a second recovery carrier signal C'2 are used. The carrier signal C'2 is recovered at a carrier recovery circuit (CR) 231 and the carrier signal C'1 is produced by way of a phase shifter ($\pi/2$) 232. The outputs from the mixers 215 and 225 are applied, via low-pass filters (LPF) 214 and 224, to a first demodulator (213, 212, 211) and a second demodulator (223, 222, 221) so that original data are demodulated to obtain a first digital output data D'1 and a second digital output data D'2, respectively.

The features of the present invention in the system of FIG. 1 are the first level converter (111, 112, 113), the second level converter (121, 122, 123), the first demodulator (213, 212, 211), and the second demodulator (223, 222, 221). It should be noted that, according to the present invention, it is essential to construct the first and second level converters in the transmitter unit 100 such as shown in FIG. 1, but it is not essential to construct the first and second demodulators in the receiver unit 200 such as shown therein. The first and second demodulators may be constructed as conventional.

The reason why the first and second level converters (111, 112, 113 and 121, 122, 123) must be constructed as shown in FIG. 1 will be given below.

Figure 2:
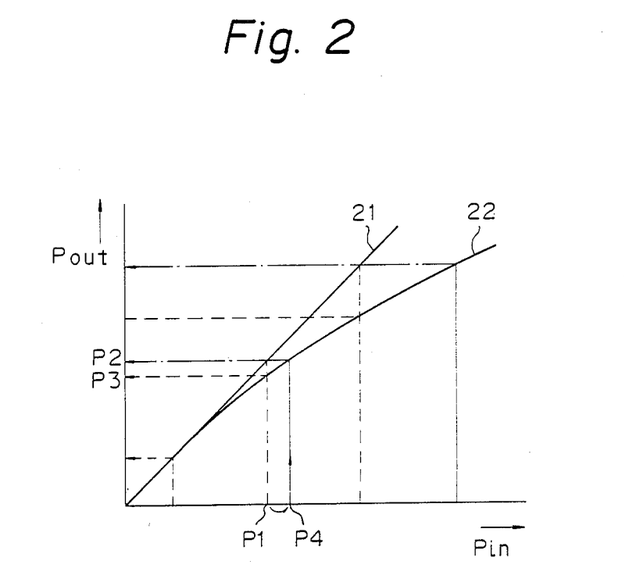
FIG. 2 is a graph of input-output characteristics of a transmitting amplifier shown in FIG. 1.

It should be remembered here that an object of the present invention lies in assuring data reliability and further that one of the factors deteriorating data reliability resides in non-linearity of the amplifier 136 in FIG. 1. FIG. 2 is a graph of input-output characteristics of the amplifier 136 shown in FIG. 1. In the graph, the abscissa indicates a level $P_{in}$ of the input signal, while the ordinate indicates a level $P_{out}$ of the output signal. The relationship between the levels $P_{in}$ and $P_{out}$ is ideally linear. That is, the level $P_{out}$ should vary with the level $P_{in}$ along a line 21. In actuality, however, the level $P_{out}$ varies with the level $P_{in}$ along a curve 22, exhibiting non-linearity. This is mainly caused by a saturation phenomena inherent to the amplifier 136.

Up until now, such non-linearity has not caused much data error and therefore could be disregarded. Referring to the data transmitting-receiving system of FIG. 1, even with some non-linearity, there is almost no likelihood of data error in the case of a usual fourvalue quadrature amplitude modulation, in which four digital input values ("0", "0"), ("0", "1"), ("1", "0"), and ("1", "1") are allotted to the phases of 0, $\pi/2$, $\pi$, and $3/2\pi$, respectively. Even with only a little nonlinearity, however, there is a likelihood of data error due to error in reading data in the case of a higher multivalue quadrature amplitude modulation method, such as a 16, 32, or 64 value method adopted to cope with increased amounts of transmission data. Under such circumstances, the threshold levels for discriminating individual data necessarily become closer to each other, increasing the likelihood of a read error.

According to the present invention, the actual non-linear relationship between the levels $P_{in}$ and $P_{out}$ is transformed by the first and second level converters of FIG. 1 with a linear relationship as indicated by line 21 of FIG. 2. The first level converter comprises a first memory circuit 111 and a first D/A converter 113. The second level converter comprises a second memory circuit 121 and a second D/A converter 123. The blocks (112, 122) located between the memory circuits and D/A converters represent adders.

The first memory circuit 111 receives, as an address input, the first digital input data D1 and produces a first digital output d11 to be applied to the first D/A converter 113. Simultaneously, the memory circuit 111 produces a first digital correction output d12 which is predetermined in relation to the first digital output d11. The output d12 is then applied, via the first adder 112, to the D/A converter 113. In this case, the first digital correction output d12 is composed of an own-side output and other-side output. The own-side output works only for the channel route of the first digital output and, therefore, is input to the first adder 112. The other-side output works only for the other channel route and, therefore, is input to the second adder 122. For the purpose of explanation, the other-side output of the digital correction output d12 will be disregarded here. A concrete explanation will be provided later. The same also applies to the other-side data of the second digital correction output d22 from the second memory circuit 121, which is input to the first adder 112. Thus, the first D/A converter 113 converts the combination of the first digital output d11 and the second digital correction output signal d22 into corresponding first analog output A1. Similarly, the second D/A converter 123 converts the combination of the second digital output d21 and the second digital correction output d22 into a corresponding second analog output A2 signal.

The first digital output d11 is a main output whose non-linearity is not compensated. Accordingly, after being amplified by the amplifier 136, the first digital output d11 exhibits the input-output characteristics represented, in FIG. 2, by the curve 22. To be specific, in FIG. 2, if the output d11 is given with an input level P1 to the amplifier 136, then a non-linear (undesired) output level P3 is produced therefrom. In this case, the desired output level, i.e., the linear output level, is not the level P3, but P2. In order to obtain the linear level P2 as intended, assuming the level $P_1$ is input, it is best to use a corrected input level P4 instead of P1. The desired linear output level P2 can therefore be produced via the non-linear curve 22. It is important to note that such conversion in level from P1 to P4 is achieved with the aid of the own-side output of the first digital correction output d12. The conversion is also achieved in the second channel route with the aid of the own-side output of the second digital correction output d22. As a result, the data error, due to the non-linearity of the amplifier 136, can be eliminated by the memory circuits (111, 121) and respective D/A converters (113, 123).

The other-side outputs of the first and second digital correction outputs will now be explained. The other-side outputs of the first and second digital correction outputs d12 and d22 are input to the second and first adders 122 and 112, respectively. These other-side outputs are made available for preventing data error caused by the previously mentioned modulation distortion of the mixer.

In the data transmitting-receiving system of FIG. 1, even with some modulation distortion there is almost no likelihood of data error in the case of a usual four-value quadrature amplitude modulation in which four digital input values ("0", "0"), ("0", "1"), ("1", "0"), and ("1", "1") are allotted to the phases of 0, $\pi/2$, $\pi$, and $3/2\pi$, respectively. Even with only a little modulation distortion, however, there is a likelihood of data error due to error in reading data in the case of a higher multivalue quadrature amplitude modulation method, such as a 16, 32, or 64 value method adopted to cope with an increased amount of transmission data. Under such circumstances, the threshold levels for discriminating individual data necessarily become closer to each other, increasing the likelihood of read error. Modulation distortion of the mixer is caused by inherent characteristics of diodes which comprise the first and second mixers 115 and 125 of FIG. 1.

Figure 3:
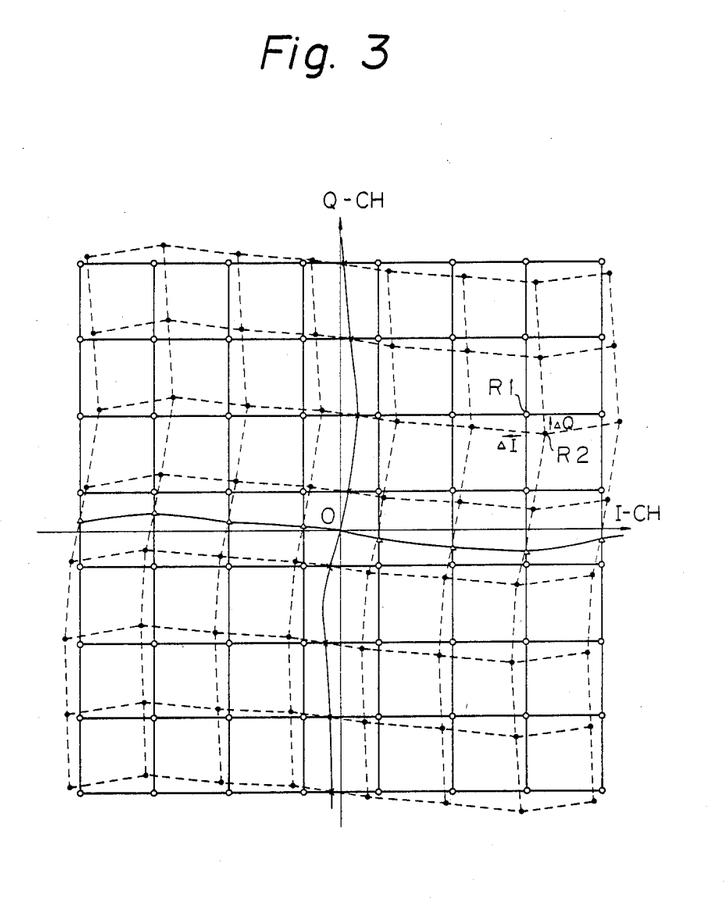
FIG. 3 is a vector diagram of the distribution of data coded under a 64 value quadrature amplitude modulation method.

FIG. 3 is a vector diagram of the distribution of data coded under a 64-value quadrature amplitude modulation method. In the diagram, the abscissa represents an in-phase channel (I-CH), and the ordinate represents a quadrature channel (Q-CH). The I-CH corresponds to, for example, the route for data D1, i.e., the first channel route, and Q-CH to the route for the data D2, i.e., the second channel route. If there were no modulation distortion in the first and second mixers 115 and 125, the 64-value coded data on the transmission line 137 would be distributed on the cross points defined by the solid line matrix and, therefore, discrimination of these data would be very easy. In actuality, however, such modulation distortion is inevitable in a mixer. Therefore, the 64-value coded data are distributed on cross points defined by the broken line matrix. As apparent from FIG. 3, since the broken line matrix is formed in a zig-zag pattern, correct discrimination of data cannot be expected. This necessarily causes data error.

Modulation distortion can be suppressed in the present invention by the following manner. For example, in FIG. 3, suppose that certain data should be located at a coded point R1. In actuality, however, the data is unintentionally shifted to a neighboring coded point R2 due to modulation distortion. In this case, if predetermined correction values are given to the data represented by the thus shifted point R2 in advance, the data can correctly be represented by the intended point R1 after cancellation of the undesired modulation distortion. It should be noted that the correction values must be given not only to own-side channel data, but also to other-side channel data. Specifically, regarding the data D1 of the first channel route (I-CH), the correction value to be given thereto in advance is not only $\Delta I$, but also $\Delta Q$, although the value $\Delta Q$ is not inherent to the concerned data D1 but to the data D2 of the second channel route (Q-CH).

Returning again to FIG. 1, the own-side output (input to the first adder 112) of the first digital correction output d12 is compensated by the correction value $\Delta I$, while the other-side output (also input to the first adder 112) of the second digital correction output d22 is compensated by the correction value $\Delta Q$. The same also applies to the second digital input data D2. That is, the own-side output (input to the second adder 122) of the second digital correction output d22 works as a correction value given to the component in a direction of the Q-CH (i.e., second channel route). The other-side output (input to the first adder 112) of the second digital correction output d22 works as a correction value given to the component in a direction of the I-CH (i.e., first channel route). The above is schematically clarified with crossings of buses in FIG. 1, i.e., each own-side bus is connected to the other-side adder. Thus, with the use of the memory circuits 111 and 121 and the corresponding D/A converters 113 and 123, data error due to modulation distortion of the first and second mixers 115 and 125 can be prevented.

Aside from non-linearity of the amplifier and modulation distortion of the mixer, data error may also be caused by temperature variation in the transmitter unit (or receiver unit). In this case, correction values to be given to the data D1 and D2 are further stored, in advance, in the first and second memory circuits 111 and 121 so as to cope with temperature variation. It should be understood that since temperature variation is not constant but changes continuously, read only memories (ROM's) are not preferable for the first and second memory circuits 111 and 121 as the circuits must be rewritten continuously. Random access memories (RAM's) are preferable since the stored data can be continually rewritten in response to continual detection data from a temperature sensor (not shown). Use of ROM's or RAM's, however, is a matter of choice. If only fixed data is concerned, such as the aforesaid non-linearity and/or modulation distortion, the first and second memory circuits 111 and 121 may be made of ROM's.

So-called IC memories may also be used for the first and second memory circuits 111 and 121. The IC memories may be ROM's or RAM's in accordance with the service needed.

Figure 4:
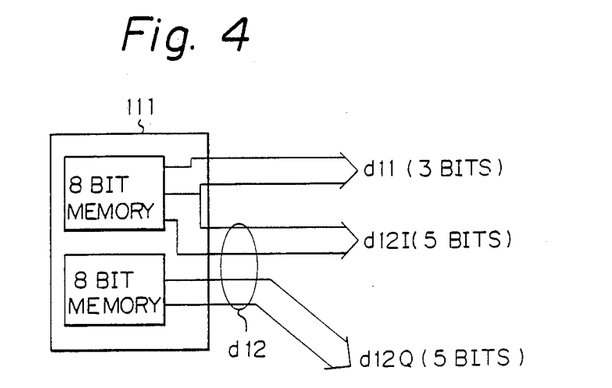
FIG. 4 is a block diagram of a memory circuit provided with data buses.

FIG. 4 is an example of a memory circuit provided with data buses. Here, "memory circuit" specifically refers to the first memory circuit 111. The same construction can also be applied to the second memory circuit 121. In FIG. 4, the character d11 denotes the previously mentioned first digital output, composed of, for example, 3 bits. The character d12I denotes the own-side output of the first digital correction output d12, while d12Q denotes the other-side output of the first digital correction output d12. Each of these outputs is composed of, for example, five bits. Thus, there are 13 (3+5+5) bits composing the digital output of the first memory circuit 111. In this example, the memory circuit 111 is fabricated by two eight-bit memories. Such an eight-bit memory is widely marketed and, therefore, easily obtainable. It should be understood that while three output bits of the eight output bits in the bottom side memory are left unused, such unused bits are not so disadvantageous considering the simplified memory construction.

In addition to the transmitter unit 100 (FIG. 1), it is advantageous to prevent data error from the receiver unit 200 (FIG. 1) as well. In the present invention, the first demodulator comprises a first receiver side analog/digital (A/D) converter 213, a first receiver side memory circuit 211, and a first receiver side adder 212 connected therebetween. The operation of the first demodulator is reverse to the previously mentioned case of the first level converter in the transmitter unit, so that the first digital output data D'1 is produced. Similarly, the second demodulator is comprised of a second receiver side A/D converter 223, a second receiver side memory circuit 221, and a second receiver side adder 222 connected therebetween. The operation of the second demodulator is reverse to the previously mentioned case of the second level converter in the transmitter unit, so that the second digital output data D'2 is produced. The first and second receiver side A/D converters 213 and 223 are operated in synchronization with a clock CLK reproduced from the transmission signal by means of a bit timing recovery circuit (BTR) 241.

In addition to preventing data error from the transmitter unit 100 and the receiver unit 200 as separate units, it is advantageous to prevent data error from the system as a whole, i.e., the transmitter unit 100, transmission line 137, and receiver unit 200. In this case, the particular factor causing the data error is not important. The correction is effected to the system as a whole whenever the resultant first and second digital output data D'1 and/or D'2 are found to be defective.

Figure 5:
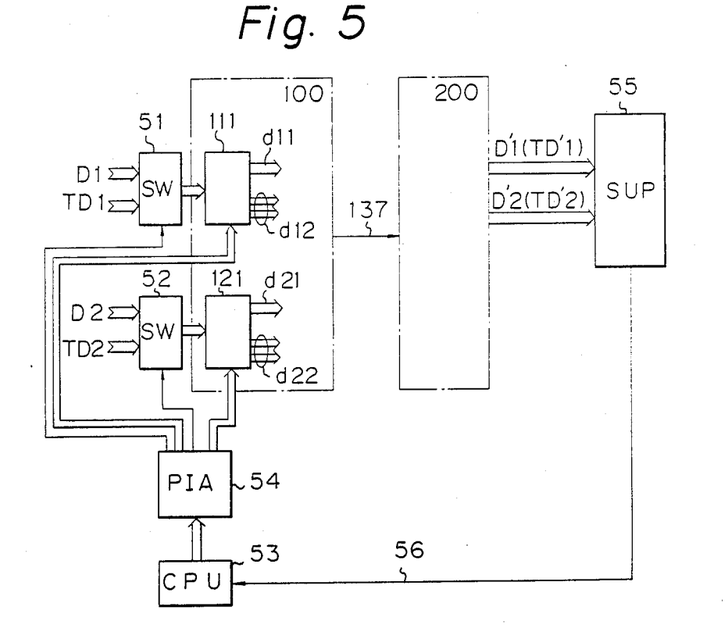
FIG. 5 is a block diagram of major portions of the circuit used for suppression of data error in the system of FIG. 1.

FIG. 5 is a block diagram of an example of major portions for suppression of data error anywhere in the system of FIG. 1. In FIG. 5 members the same as those of FIG. 1 are represented by the same reference numerals or characters. The block 55 shown at the upper right of FIG. 5 is a data-error supervising circuit (SUP) which supervises the first and second digital output data D'1 and D'2 to determine the frequency of occurrence of the data error. If the error occurs very frequently, the supervising circuit 55 triggers a central processing unit (CPU) 53 by way of a subtransmission line 56. The CPU 53 then controls, via a peripheral interface adapter (PIA) 54, both a first switch circuit (SW) 51 and a second switch circuit (SW) 52 to switch their status from an input data side (D1, D2) to a test data side (TD1, TD2). Each of the test data TD1 and TD2 has a predetermined particular data pattern. The transmitted test data TD1 and TD2 are received at the supervising circuit 55 in the form of received test data TD'1 and TD'2, respectively, and analyzed therein. The resultant analyzed information is returned, via the subtransmission line 56, to the CPU 53. The CPU 53 operates, according to the thus returned information, to output the amount of the correction values given, in advance, to the original first and second digital input data D1 and D2 so as to minimize the data error in the data D'1 and D'2. Thereafter, the first and second memory circuits 111 and 121 (both made of RAM's) are rewritten with the thus renewed correction values, thereby restarting usual data transmission in the system with minimum data error. At this time, the switch circuits 51 and 52 have already switched status to pass usual respective data D1 and D2 therethrough. It should be understood that since the subtransmission line 56 does not have to be a high-speed transmission line, the subtransmission line 56 does not have to be a separately and newly installed line, but may be an existing low-speed line or public line.

The data-error supervising circuit 55 of FIG. 5 can be realized, as one example, by a known parity error checker which receives both data D'1 and D'2 and achieves the parity check thereof.

Figure 6:
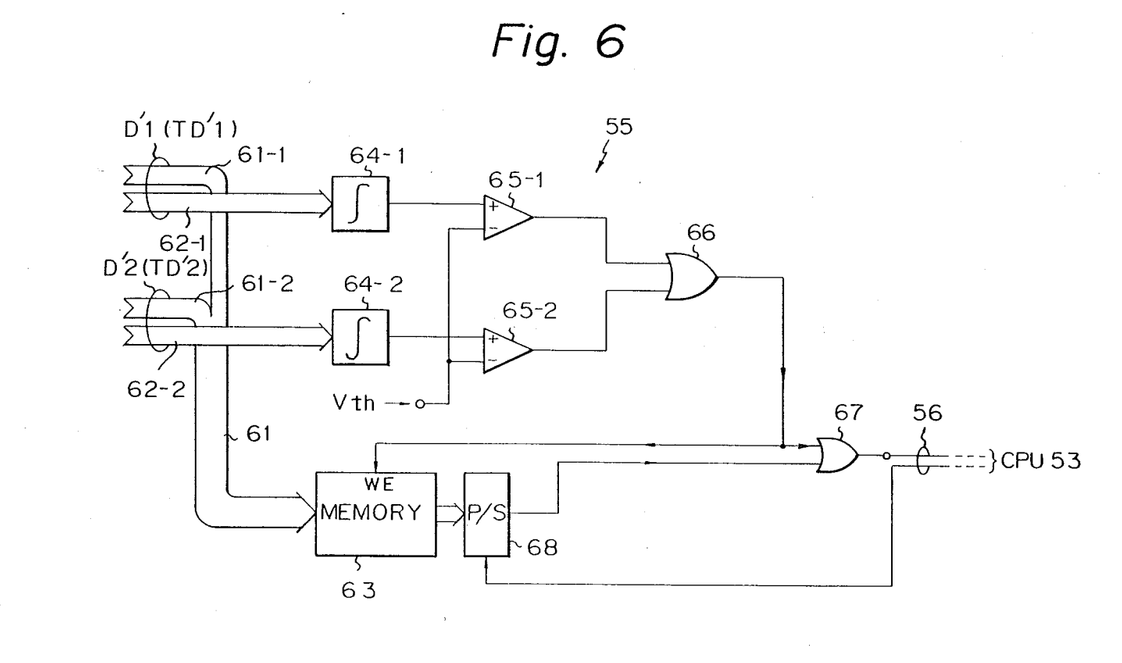
FIG. 6 is a block diagram of a data-error supervising circuit shown in FIG. 5.

FIG. 6 is another example of the dataerror supervising circuit 55 shown in FIG. 5. In FIG. 6, data buses 61-1 and 61-2 transfer the upper 3 bits of branched data D'1 (TD'1) and branched data D'2 (TD'2), respectively. These two sets of three-bit data are stored, via a data bus 61, in a memory circuit 63. The lower five bits thereof are applied, respectively, to a first integrator 64-1 and a second integrator 64-2, via respective A/D converters (not shown). The outputs from the integrators 64-1 and 64-2 are applied to a first comparator 65-1 and a second comparator 65-2, respectively. Both commonly receive a threshold level voltage $V_{th}$. When the transmission data include no error, the lower five bits thereof are usually all logic "0". However, if an error is included, bit or bits of logic "1" are very liable to occur. In the latter case, the output level from at least one of the integrators 64-1 and 64-2 exceeds the predetermined threshold level of $V_{th}$. If the output level exceeds the level of $V_{th}$, the comparator 65-1 and/or the comparator 65-2 produce an output of logic "1", which is provided through an OR gate 66, indicating that data error occurs. The data error indication signal is supplied, on one hand, to the CPU 53 (FIG. 5), via an OR gate 67 and the subtransmission line 56 and, on the other hand, to the memory circuit 63, at its write enable terminal WE, so as to put it in a write mode. When the CPU 53 receives the data error indication signal, the CPU 53, operates to switch the switch circuits 51 and 52 (FIG. 5) to transmit the test data TD1 and TD2 instead of D1 and D2, and also, triggers a parallel/serial converter (P/S) 68. Thus, both upper three bits of data, i.e., main data of the received test data TD'1 and TD'2, once stored in the memory circuit 63, are returned, in the form of serial data, to the CPU 53, via the OR gate 67 and the line 56, for analysis thereby.

As explained above in detail according to the present invention, the memory circuits and the D/A (or A/D) converters cooperating therewith enable the data transmitting-receiving system to suppress data error and, therefore, high quality data communication results.

What is claimed is:

1. A data transmitting-receiving system having own-side and other-side channel routes operatively connected to receive and transmit digital input data, comprising:
    a transmitter unit, for converting the digital input data on the own-side and other-side channel routes into analog output signals, said transmitting unit comprising:
        memory circuits, respectively, operatively connected to receive the digital input data as address signals, for outputting digital output data and digital correction output signals corresponding to the data on the own-side and the other-side channel routes;
        carrier generator means for generating carrier signals;
        digital-to-analog (D/A) converters, respectively, operatively connected to said memory circuits, for receiving and converting the digital output data from said memory circuits and the digital correction output signals corresponding to the own-side channel route and the other-side channel route, into analog output signals;
        own-side and other-side modulators, operatively connected to said D/A converters and said carrier generator means, for receiving the analog output signals and the carrier signals and for modulating a first one of said carrier signals and a second one of said carrier signals, which is phase-shifted with respect to said first one of said carrier signals, with a respective one of the analog output signals and generating a modulated outputs signal; and
        combining means, operatively connected to said own-side and other-side modulators, for combining the modulated output signals;
    a transmission line, operatively connected to said combining means of said transmitter unit, for receiving the combined modulated output signals from said combining means; and
    a receiver unit, operatively connected to said transmission line, for receiving the combined modulated output signals from said combining means of said transmitter unit and reproducing the data on the own-side channel route and other-side channel route.

2. A system as set forth in claim 1, wherein a first one of said memory circuits and a first one of said D/A converters comprise a first level converter, wherein said first one of said memory circuits, operatively connected to receive the digital input data from a first one of said channel routes as an address input signal, producing a corresponding first digital output data to be applied to said first one of said D/A converters, and, simultaneously, said first one of said memory circuits producing a first one of said digital correction output data corresponding to the digital input data of the first one of said channel routes, to be applied to said first one of said D/A converters;

said first one of said D/A converters, operatively connected to receive the first digital output data and said first one of said digital correction data, producing a first one of said analog output signals; and wherein a second one of said memory circuits and a second one of said D/A converters comprise a second level converter, the second one of said memory circuits, operatively connected to receive the digital input data from a second one of said channel routes as an address input signal, producing a corresponding second digital output data to be applied to said second one of said D/A converters, and, simultaneously, said second one of said memory circuits producing a second one of said digital correction output data corresponding to the digital input data of the second one of said channel routes, to be applied to said second one of said D/A converters, said second one of said D/A converters, operatively connected to receive the second digital output data and said first and second one of said digital correction output data, producing a second one of said analog output signals.

3. A system as set forth in claim 2,
wherein said first one of said digital correction output signals from said first one of said memory circuits comprises:
a first own-side correction output data applied to said first one of said D/A converters; and
a first other-side correction output data applied to said second one of said D/A converters;
wherein said second one of said digital correction output data from said second one of said memory circuits comprises:
a second own-side correction output data applied to said second one of said D/A converters; and
a second other-side correction output data applied to said first one of said D/A converters;
wherein said first level converter further comprises a first adder, operatively connected between said first one of said memory circuits and said first one of said digital-to-analog converters and operatively connected to said second one of said memory circuits, for adding the first own-side correction output data and the second other-side correction output data, and applying the result to said first one of said D/A converters; and
wherein said second level converter further comprises a second adder, operatively connected between said second one of said memory circuits and said second one of said digital-to-analog converters and operatively connected to said first one of said memory circuits, for adding the second own-side correction output data and the second other-side correction output data, and applying the result to said second one of said D/A converters.

4. A system as set forth in claim 3, wherein said receiver unit comprises:
a first demodulator, operatively connected to said transmitter unit, for producing first digital output data, comprising:
a first receiver side A/D converter, operatively connected to said transmitter unit, for receiving said first analog output data from said transmitter unit and outputting a first digital output data;
a first receiver side memory circuit, operatively connected to said first receiver side A/D converter, for receiving the first digital output data from said first receiver side A/D converter and outputting a first digital output signal; and
a first receiver side adder operatively connected between said first receiver side A/D converter and said first receiver side memory circuit; and
a second demodulator, operatively connected to said transmitter unit, for producing second digital output data, comprising:
a second receiver side A/D converter, operatively connected to said transmitter unit, for receiving said second analog output data from said transmitter unit and outputting second digital output data;
a second receiver side memory circuit, operatively connected to said second receiver side A/D converter, for receiving the second digital output data from said second receiver side A/D converter and outputting a second digital output signal; and
a second receiver side adder, operatively connected between said second receiver side A/D converter and said second receiver side memory circuit.

5. A system as set forth in claim 4, further comprising a subtransmission line,
wherein said receiver unit further comprises a data-error supervising circuit, operatively connected to said first and second receiver side memories, for determining the frequency of occurrence of a data error in the first and second digital output signals and outputting resultant information,
wherein said transmitter unit further comprises a central processing unit, operatively connected to said data error supervising circuit, for receiving the resultant information from the data-error supervising circuit and, renewing, according to the resultant information, the first and second digital correction output data by rewriting the contents of said first and second ones of said memory circuits in said transmitter unit.

6. A system as set forth in claim 5, wherein said data-error supervising circuit comprises a parity checker.

7. A system as set forth in claim 5, wherein said data-error supervising circuit comprises:
a first integrator, operatively connected to said first A/D converter, for receiving lower bits of said first digital output data and outputting a first output level;
a first comparator, operatively connected to said first integrator, for comparing the first output level of said first integrator with a predetermined threshold level;
a second integrator, operatively connected to said second A/D converter, for receiving lower bits of said second digital output data and outputting a second output level;
a second comparator, operatively connected to said second integrator, for comparing the second output level of said second integrator with the predetermined threshold level;
an OR gate, operatively connected to said first and second comparators, for generating logical OR outputs from said first and second comparators; and a third memory circuit, operatively connected to said OR gate, for storing the upper bits of both the first and second digital output data in accordance with the output of said OR gate.

8. A system as set forth in claim 5, wherein said transmitter unit further comprises a first switch circuit and a second switch circuit, both operatively connected to said central processing unit, for providing first test data and second test data, rather than said first and second digital input data, respectively, in accordance with said central processing unit.

9. A data transmitting-receiving system operatively connected to receive digital input data, comprising:
a transmitter unit, operatively connected to receive the digital input data, including level converter circuits, each of said level converter circuits comprising:
a first memory circuit, operatively connected to receive the digital input data as address signals, and outputting digital output data and digital correction data including own-side data and other-side data;
a first adder circuit, respectively operatively connected to said first memory circuit, for receiving the own-side data and the other-side data and generating digital correction output data;
a D/A converter, respectively, operatively connected to said first adder circuit and said first memory circuit, for receiving the digital input data and the digital correction output data and producing analog output signals;
carrier generator means for generating carrier signals;
own-side and other-side modulators, operatively connected to said D/A converter and to said carrier generator means, for receiving the analog output signals and the carrier signals and for modulating a first one of said carrier signals, and a second one of said carrier signals, which is phase shifted with respect to said first one of said carrier signals, with a respective one of analog output signals for generating a modulated output signal; and
combining means, operatively connected to said own-side and to said other-side modulators, for combining the modulated output signals; and
a receiver unit, operatively connected to said transmitter unit, for receiving the combined modulated output signals, said receiving unit including demodulator means, each of said demodulator means comprising:
an A/D converter, operatively connected to said combining means, for receiving the combined modulated output signals and regenerating the own-side channel route data and the other-side channel route data and outputting digital output signals and output correction data corresponding to the own-side correction output data and the other-side correction output data;
a second adder circuit, respectively, operatively connected to said A/D converter, for receiving the digital output signals as address signals, the own-side correction output data and the other-side correction output data and producing digital correction signals; and
a second memory circuit, respectively, operatively connected to said A/D converter and to said second adder circuit, for receiving the digital output signals and the digital correction signals, and producing digital output data corresponding to the digital input data.

10. A data-transmitting-receiving system having a transmitter unit comprising:
a first digital input channel including first digital input data;
a second digtal input channel including second digital input data different from said first digital input data;
first means, operatively connected to said first input channel, for receiving the first digital input data and for outputting first digital output data, first input digital correction signals and first output digital correction signals;
second means, operatively connected to said second input channel, for receiving the second digital input data and for outputting second digital output data, second input digital correction signals, and second output digital correction signals;
first combining means, operatively connected to receive the first input digital correction signals and the second output digital correction signals, for outputting first combined signals;
second combining means, operatively connected to receive the second input digital correction signals and the first output digital correction signals, for outputting second combined signals;
first converting means, operatively connected to said first combining means and said first means, for converting a combination of the first digital output data and the first combined signals into corresponding first analog output signals; and
second converting means, operatively connected to said second combining means and said second means, for converting a combination of the second digital output data and the second combined signals into corresponding second analog output signals.

* * * * *

UNITED STATES PATENT AND TRADEMARK OFFICE
CERTIFICATE OF CORRECTION

PATENT NO. : 4,573,153
DATED : FEBRUARY 25, 1986
INVENTOR(S) : HIROSHI NAKAMURA ET AL.

It is certified that error appears in the above-identified patent and that said Letters Patent is hereby corrected as shown below:

```
Col. 3, line 37, "fourvalue" should be --four-value--.

Col. 4, line 14, delete "signal"; after "into" insert --a--;
        line 15, "output Al." should be --output signal
                    Al.--;
        line 18, "output A2 signal." should be --output
                    signal A2.--.

Col. 6, line 45, "is comprised of" should be --comprises--.

Col. 7, line 29, after "switched" insert --their--;
        line 33, "separately" should be --separate--;
        line 40, "dataerror" should be --data-error--.

Col. 8, line 45, "outputs" should be --output--.
```

Signed and Sealed this

Seventeenth Day of June 1986

[SEAL]

Attest:

DONALD J. QUIGG

Attesting Officer

Commissioner of Patents and Trademarks